United States Patent
Rochan Meganathan et al.

(10) Patent No.: US 10,684,131 B2
(45) Date of Patent: Jun. 16, 2020

(54) METHOD AND SYSTEM FOR GENERATING AND UPDATING VEHICLE NAVIGATION MAPS WITH FEATURES OF NAVIGATION PATHS

(71) Applicant: WIPRO LIMITED, Bangalore (IN)

(72) Inventors: Ranjith Rochan Meganathan, Ooty (IN); Aarthi Alagammai Kasi, Dindigul (IN); Sujatha Jagannath, Bangalore (IN); Raghottam Mannopantar, Bangalore (IN)

(73) Assignee: Wipro Limited, Bangalore (IN)

( * ) Notice: Subject to any disclaimer, the term of this patent is extended or adjusted under 35 U.S.C. 154(b) by 190 days.

(21) Appl. No.: 15/901,064

(22) Filed: Feb. 21, 2018

(65) Prior Publication Data
US 2019/0204089 A1    Jul. 4, 2019

(30) Foreign Application Priority Data
Jan. 4, 2018 (IN) .............................. 201841000427

(51) Int. Cl.
*G01C 21/32* (2006.01)
*G01S 17/89* (2020.01)
(Continued)

(52) U.S. Cl.
CPC .............. *G01C 21/32* (2013.01); *G01S 7/003* (2013.01); *G01S 7/41* (2013.01); *G01S 7/4802* (2013.01);
(Continued)

(58) Field of Classification Search
CPC ................. B60W 10/06; B60W 10/20; B60W 2550/147; B60W 30/00; B60W 30/095;
(Continued)

(56) References Cited

U.S. PATENT DOCUMENTS 6,112,141 A * 8/2000 Briffe .................... G01C 23/00
                                                    345/1.3
7,831,433 B1   11/2010 Belvin et al.
(Continued)

OTHER PUBLICATIONS

N.J. Sucgang, et al., "Road Surface Obstacle Detection using Vision and LIDAR for Autonomous Vehicle", *IMECS 2017*. Mar. 15-17, 2017, vol. 1, 5 pages.

*Primary Examiner* — Hunter B Lonsberry
*Assistant Examiner* — Matthew J. Reda
(74) *Attorney, Agent, or Firm* — Finnegan, Henderson, Farabow, Garrett & Dunner, LLP

(57) ABSTRACT

This disclosure relates generally to vehicle navigation maps, and more particularly to method and system for generating and updating vehicle navigation maps with features of navigation paths. In one embodiment, a method may include receiving a position of a vehicle and an environmental field of view (FOV) of the vehicle along a navigation path of the vehicle on a navigation map, extracting features of the navigation path from the environmental FOV, correlating the features with the navigation path on the navigation map based on the position, generating a features based navigation map based on the correlation, and transmitting the features based navigation map to a server of a navigation map service provider for storage and for subsequent use. The features based navigation map, when required to assist a navigation of another vehicle, may be accessed to assess the features of the navigation path and to provide the assessment to the other vehicle.

16 Claims, 9 Drawing Sheets

(51) Int. Cl.
*G06K 9/00* (2006.01)
*G06F 16/29* (2019.01)
*G01S 7/41* (2006.01)
*G01S 7/00* (2006.01)
*G01S 13/86* (2006.01)
*G01S 7/48* (2006.01)
*G01S 13/89* (2006.01)
*G01S 17/931* (2020.01)
*G01S 13/931* (2020.01)

(52) U.S. Cl.
CPC ............ *G01S 13/86* (2013.01); *G01S 13/89* (2013.01); *G01S 17/89* (2013.01); *G06F 16/29* (2019.01); *G06K 9/00791* (2013.01); *G06K 9/00798* (2013.01); *G01S 13/862* (2013.01); *G01S 13/865* (2013.01); *G01S 13/867* (2013.01); *G01S 17/931* (2020.01); *G01S 2013/932* (2020.01); *G01S 2013/9316* (2020.01); *G01S 2013/9322* (2020.01); *G01S 2013/9323* (2020.01)

(58) Field of Classification Search
CPC ...... G01S 17/936; G01S 17/4817; G05D 1/00; G05D 1/0238; G05D 1/024; G05D 1/0242; G05D 1/0274; G05D 1/0278; G05D 2201/0213; G06K 9/00798; G06K 9/2036; G06F 16/288
See application file for complete search history.

(56) References Cited

U.S. PATENT DOCUMENTS

| | | | |
|---|---|---|---|
| 8,050,863 B2 | 11/2011 | Trepagnier et al. | |
| 8,825,260 B1* | 9/2014 | Silver | G01S 17/936 342/118 |
| 2010/0057336 A1* | 3/2010 | Levine | G01C 21/32 701/532 |
| 2011/0106807 A1 | 5/2011 | Srihari et al. | |
| 2013/0253753 A1 | 9/2013 | Burnette et al. | |
| 2014/0350841 A1* | 11/2014 | Xue | G01C 21/26 701/409 |
| 2018/0095474 A1* | 4/2018 | Batur | G06K 9/4604 |
| 2019/0056498 A1* | 2/2019 | Sonn | G01S 17/107 |

* cited by examiner

US 10,684,131 B2

METHOD AND SYSTEM FOR GENERATING AND UPDATING VEHICLE NAVIGATION MAPS WITH FEATURES OF NAVIGATION PATHS

TECHNICAL FIELD

This disclosure relates generally to vehicle navigation maps, and more particularly to method and system for generating and updating vehicle navigation maps with features of navigation paths.

BACKGROUND

In today's world, motor vehicles have become a primary mode of commuting. With each passing day, these vehicles are becoming smart and aware about their surroundings and environment. Today a typical motor vehicle may be equipped with features like navigation assist, parking assist, and so forth. In coming times, the motor vehicles will become smarter, more intelligent, and autonomous. For example, autonomous vehicles may be capable of navigating without manual intervention, thereby facilitating efficient and effective transportation.

These smart or autonomous vehicles may be capable of sensing the dynamic changing environment, detecting obstacles on a navigation path, automatically controlling speed, automatically breaking, autonomous navigation, performing vehicle diagnostic analysis, and so forth. However, these features would require a lot of computing power by the vehicle control system so as to quickly process enormous data and make it readily available for the vehicle control system for decision making.

One of the requirement to enable some of the above mentioned features is to extract the road features such as width of road, humps present in the road, number of road intersection, angle of turn at intersection, slope of the road, etc. As will be appreciated, extracting these important road features needs more computing power and expensive hard wares such as light detection and ranging (LIDAR) scanner etc. in each of the vehicles. Currently available navigation maps (e.g., GOOGLE maps) do not provide information on above mentioned road features, and dynamically extracting such information while a vehicle is running using sensors installed on the vehicle becomes expensive and computationally intensive. In some cases, the dynamic generation of navigation map and extraction road features may also require continuous communicative connection with a central server, and may fail when the connection is interrupted.

SUMMARY

In one embodiment, a method for generating a vehicle navigation map with features of a navigation path is disclosed. In one example, the method may include receiving a position of a vehicle and an environmental field of view (FOV) of the vehicle along a navigation path of the vehicle on a navigation map. The method may further include extracting a plurality of features of the navigation path from the environmental FOV. The method may further include correlating the plurality of features with the navigation path on the navigation map based on the position. The method may further include generating a features based navigation map based on the correlation. The method may further include transmitting the features based navigation map to a server of a navigation map service provider for storage and for subsequent use. The features based navigation map, when required to assist a navigation of another vehicle, may be accessed to assess the plurality of features of the navigation path and to provide the assessment to the other vehicle.

In one embodiment, a system for generating a vehicle navigation map with features of a navigation path is disclosed. In one example, the system may include at least one processor and a memory communicatively coupled to the at least one processor. The memory may store processor-executable instructions, which, on execution, may cause the processor to receive a position of a vehicle and an environmental field of view (FOV) of the vehicle along a navigation path of the vehicle on a navigation map. The processor-executable instructions, on execution, may further cause the processor to extract a plurality of features of the navigation path from the environmental FOV. The processor-executable instructions, on execution, may further cause the processor to correlate the plurality of features with the navigation path on the navigation map based on the position. The processor-executable instructions, on execution, may further cause the processor to generate a features based navigation map based on the correlation. The processor-executable instructions, on execution, may further cause the processor to transmit the features based navigation map to a server of a navigation map service provider for storage and for subsequent use. The features based navigation map, when required to assist a navigation of another vehicle, may be accessed to assess the plurality of features of the navigation path and to provide the assessment to the other vehicle.

In one embodiment, a non-transitory computer-readable medium storing computer-executable instructions for generating a vehicle navigation map with features of a navigation path is disclosed. In one example, the stored instructions, when executed by a processor, may cause the processor to perform operations including receiving a position of a vehicle and an environmental field of view (FOV) of the vehicle along a navigation path of the vehicle on a navigation map. The operations may further include extracting a plurality of features of the navigation path from the environmental FOV. The operations may further include correlating the plurality of features with the navigation path on the navigation map based on the position. The operations may further include generating a features based navigation map based on the correlation. The operations may further include transmitting the features based navigation map to a server of a navigation map service provider for storage and for subsequent use. The features based navigation map, when required to assist a navigation of another vehicle, may be accessed to assess the plurality of features of the navigation path and to provide the assessment to the other vehicle.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
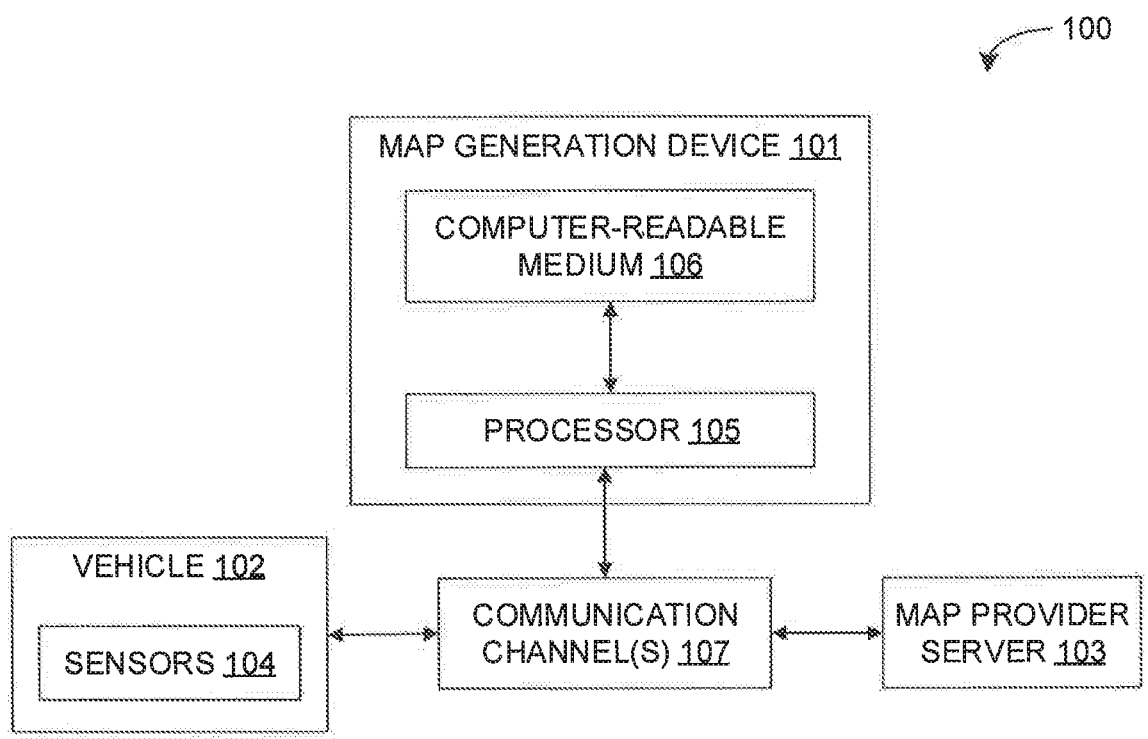
FIG. 1 is a block diagram of an exemplary system for generating and updating vehicle navigation maps with features of navigation paths in accordance with some embodiments of the present disclosure.

Referring now to FIG. 1, an exemplary system 100 for generating and updating vehicle navigation maps with features of navigation paths is illustrated in accordance with some embodiments of the present disclosure. In particular, the system 100 may include a map generation device 101, a vehicle 102, and a map provider server 103. The map generation device 101 may receive a pre-generated navigation path on a navigation map from the map provider server 103, extract features of the navigation path, and generate or update the navigation map with the extracted features. The features may include, but are not limited to, width of the navigation path, humps present on the navigation path, a number of intersection, an angle of turn at an intersection, a slope of the navigation path, and so forth. The features based navigation map (i.e., navigation map with features of the navigation paths) may be employed to assist navigation of the vehicle 102 as well as other such vehicles through the map provider server 103. For example, the vehicle control system may readily use the information on features of the navigation path to save its computing power and to make quick decisions for navigation. In some embodiments, the assistance in navigation may include, but is not limited to, performing autonomous navigation, providing alert to the passengers (including the driver) with information on the navigation path, recommending course correction, recommending action, and so forth.

As will be appreciated by those skilled in the art, the map provider server 103 may be a server of any service provider that may provide a high-resolution navigation map of the region (i.e., a detailed geographic map of the region) along with a navigation path between a source and a destination. It should be noted that, in some embodiments, the high-resolution navigation map may be a LIDAR map in terms of data point cloud of the region, and the navigation path may be in terms of Cartesian coordinate point array on the navigation map. Further, the navigation map may be a features based navigation map (i.e., navigation map with features of the navigation path) in accordance with some embodiments of the present disclosure.

As will be appreciated by those skilled in the art, the vehicle may be any vehicle capable of receiving the navigation map along with the navigation path from the map provider server 103. In some embodiments, the vehicle 102 may be any vehicle capable of sensing the dynamic changing environment using sensors. For example, the vehicle 102 may be an autonomous vehicle capable of sensing the dynamic changing environment as well as of navigating without any human intervention. Thus, the vehicle 102 may include at least a number of sensors 104, a vehicle drivetrain, and a processor based control system, among other components. The one or more sensors 104 may enable sensing of the dynamic changing environment, and may include a global positioning system (GPS) sensor, an inertia measurement unit (IMU), a laser scanner, a light detection and ranging (LIDAR) scanner, a short range radar, a camera, an ultrasonic sensor, an odometer, and so forth. The one or more sensors 104 may capture various sensor parameters such as current position (location) and orientation (direction) of the vehicle 102 within a global reference frame, a field of view (FOV) of the environment (e.g., FOV of the navigation path), an image of the environment, a presence of any other object in the vicinity of the vehicle 102, and so forth. As will be appreciated, the sensor parameters may enable the map generation device 101 to locate the vehicle 102 on the navigation path, to extract a number of features of the navigation path, and to generate a features based navigation map. The processor based control system may receive sensors parameters from the sensors 104. Further, the processor based control system may receive features map (i.e., features of the navigation path) from the map generation device 101 or from the map provider server 103. The processor based control system may then process sensor data or the features map, and may accordingly control the vehicle drivetrain.

As will be appreciated, the navigation map may not include features of the navigation path, or may not accurately reflect the features of the navigation path due to it being generated based on outdated navigation map. It is therefore desirable to generate the features based navigation map or update the features on the features based navigation map so as to assist a navigation of the vehicle 102 as well as other such vehicles. The map generation device 101 may therefore implement a map generation engine for generating or updating vehicle navigation maps with features of navigation paths in accordance with some embodiments of the present disclosure. As will be described in greater detail in conjunction with FIGS. 2-8, the map generation engine may receive a pre-generated navigation path on a navigation map from the map provider server 103, receive an environmental FOV of the vehicle 102 along the navigation path of the vehicle 102 from the sensors 104, and receive or determine a location of the vehicle 102 on the pre-generated navigation path based on sensor parameters received from the sensors 104. The map generation engine may further extract features of the navigation path from the environmental FOV, correlate the extracted features with the navigation path on the navigation map based on the position, generate a features based navigation map based on the correlation, and transmit the features based navigation map to the map provider server 103 of the navigation map service provider for storage and for subsequent use. As stated above, the features based navigation map, when required to assist a navigation of another vehicle, may be accessed to assess the features of the navigation path and to provide the assessment to the other vehicle.

The map generation device 101 may include one or more processors 105, and a computer-readable medium (e.g., a memory) 106. The computer-readable medium 106 may store instructions that, when executed by the one or more processors 105, may cause the one or more processors 105 to generate or update the features based navigation map in accordance with aspects of the present disclosure. The computer-readable storage medium 106 may also store multiple sensor parameters captured by the sensors 104 and other data as required or as processed by the map generation device 101 or the system 100. The one or more processors 105 may perform data processing functions so as to receive the pre-generated navigation path on the navigation map, receive the environmental FOV along the navigation path, receive or determine the location of the vehicle along the navigation path, extract the features of the navigation path from the environmental FOV, correlate the extracted features with the navigation path based on the position, generate the features based navigation map, and update the features based navigation map.

Each of the map generation device 101, the vehicle 102, and the map provider server 103 may interact among each other over various communication channels 107. For example, in some embodiments, the map generation device 101 may receive the navigation map along with the pre-generated navigation path from the map provider server 103 over a communication channel 107, and may receive sensor parameters from the vehicle 102 over a separate communication channel 107. Alternatively, in some embodiments, the vehicle 102 may receive the navigation map along with the pre-generated navigation path from the map provider server 103 over a communication channel 107, while the map generation device 101 may receive sensor parameters as well as the navigation map along with the pre-generated navigation path from the vehicle 102 over a separate communication channel 107. Further, in some embodiments, the vehicle 102 may receive the features of the navigation path from the map generation device 101 over the communication channel 107. In some embodiments, the vehicle 102 may also receive the navigation map along with the pre-generated navigation path from the map generation device 101 over the communication channel. Alternatively, in some embodiments, the vehicle 102 may receive pre-generated navigation path on the navigation map along with the features of the navigation path from the map provider server 103 over a communication channel 107. The communication channel 107 may be any wired or wireless communication channel based on different communication technologies (e.g., satellite communication technology, television communication technology, mobile communication technologies, WiFi, WiMax, optical fibre, coaxial cable, universal serial bus (USB), high-definition multimedia interface (HDMI), Bluetooth, and so forth).

As will be appreciated, in some embodiments, the map generation device 101 may be located locally with respect to the vehicle 102. For example, in some embodiments, the map generation device 101 may be a separate device in communication with the vehicle 102. Alternatively, in some embodiments, the map generation device 101 may be embedded within the vehicle 102. Further, as will be appreciated, in some embodiments, the map generation device 101 may be located remotely with respect to the vehicle 102. For example, in some embodiments, the map generation device 101 may be located in a remote server of a navigation service provider. Alternatively, in some embodiments, the map generation device 101 may be embedded within the map provider server 103.

Further, as will be appreciated, in some embodiments, various components of the map generation device 101 may be physically located together in one device. Alternatively, in some embodiments, the components of the map generation device 101 may be physically distributed across various devices. For example, the processors 105 and the computer readable medium 106 of the map generation device 101 may be physically located together in one device (e.g., the map generation device 101) or may be physically distributed across various devices (e.g., the map generation device 101, the vehicle 102, and/or the map provider server 103). Similarly, in some embodiments, some or all of the sensors 104 may be a part of the map generation device 101 even though they may be located in the vehicle 102.

Figure 2:
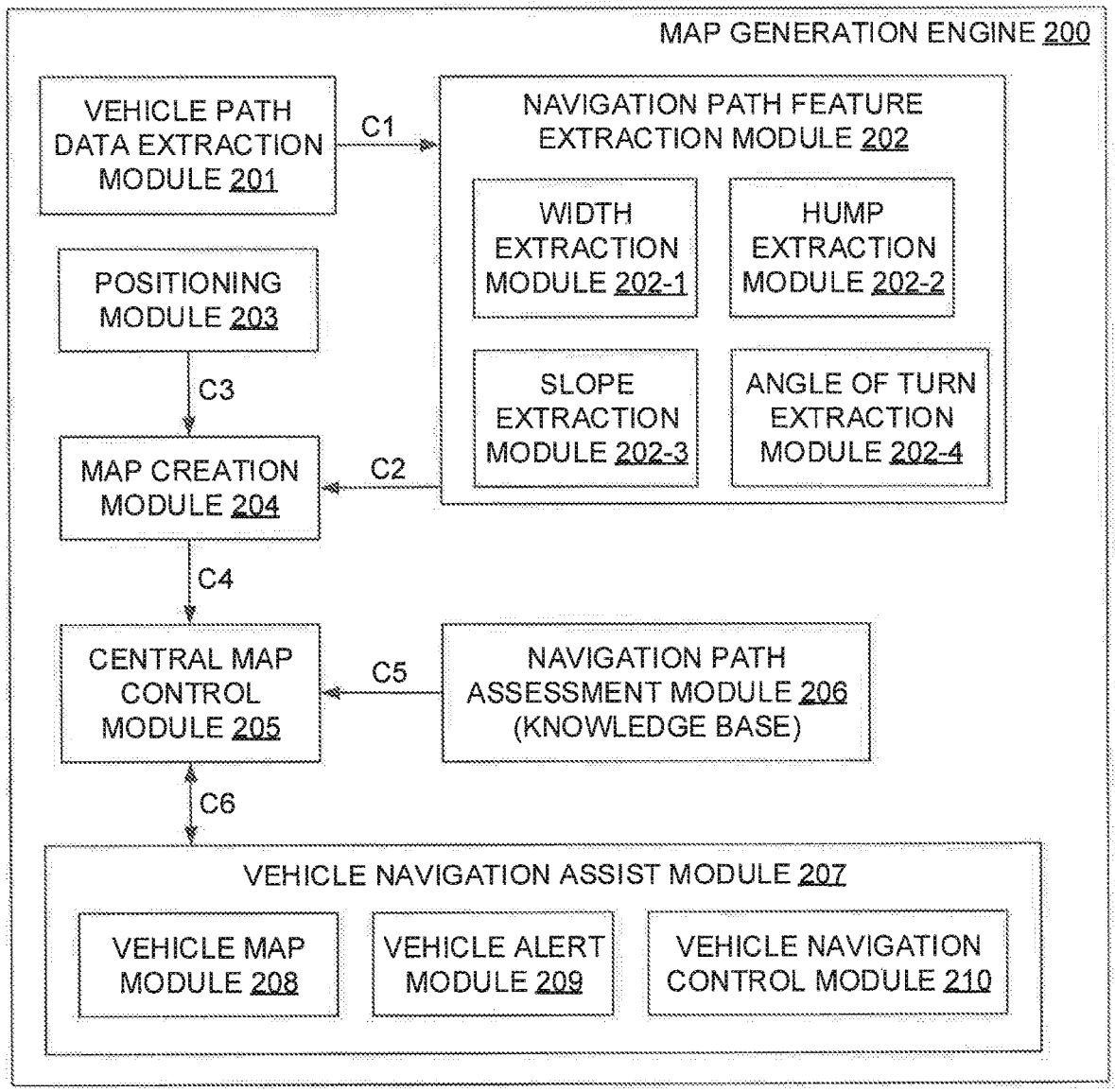
FIG. 2 is a functional block diagram of a map generation engine in accordance with some embodiments of the present disclosure.

Referring now to FIG. 2, a functional block diagram of the map generation engine 200 implemented by the map generation device 101 of the system 100 of FIG. 1 is illustrated in accordance with some embodiments of the present disclosure. The map generation engine 200 may include various modules that perform various functions so as to generate or update the features based navigation map in accordance with aspects of the present disclosure. In some embodiments, the map generation engine 200 includes a vehicle path data extraction module 201, a navigation path feature extraction module 202, a vehicle positioning module 203, a map creation module 204, a central map control module 205, a navigation path assessment module 206, and a vehicle navigation assist module 207. As will be appreciated by those skilled in the art, each of the modules 201-207 may reside, in whole or in parts, on any of the map generation device 101, the vehicle 102, or the map provider server 103. The navigation path feature extraction module 202 may further comprise of a width extraction module 202-1, a hump extraction module 202-2, a slope extraction module 202-3, and an angle of turn extraction module 202-4.

The vehicle path data extraction module 201 may acquire environmental FOV along the navigation path of the vehicle through one or more sensors (e.g., laser scanner, LIDAR scanner, short range radar, etc.). In some embodiments, the LIDAR scanner may be placed in the hood of the vehicle at a certain distance (say, 1.5 meters) from the ground in such a way that the entire navigation path in front of the vehicle may be clearly visible. The LIDAR scanner may capture all the data as the vehicle navigates along the navigation path. As will be appreciated, the LIDAR data may captured in data points cloud format.

The navigation path feature extraction module 202 receives the environmental FOV along the navigation path of the vehicle from the vehicle path data extraction module 201 through an interconnect C1. The navigation path feature extraction module 202 may then extract one or more features of the navigation path from the environmental FOV. As stated above, the one or more features may include, but are not limited to, width of the navigation path, angle of elevation (i.e., slope) of the navigation path, position and slope of a hump on the navigation path, angle of turn at an intersection on the navigation path, a number of intersections on the navigation path, and so forth. In an embodiment, the width extraction module 202-1 of the navigation path feature extraction module 202 may be configured to extract the width of the navigation path. In an embodiment, the hump extraction module 202-2 of the navigation path feature extraction module 202 may be configured to extract position and slope of a hump on the navigation path. In an embodiment, the slope extraction module 202-3 of the navigation path feature extraction module 202 may be configured to extract angle of elevation (i.e., slope) of the navigation path. In an embodiment, the angle of turn extraction module 202-4 of the navigation path feature extraction module 202 may be configured to extract angle of turn at an intersection on the navigation path. In some embodiments, the features may be extracted by extracting and analyzing ground data points from environmental data points cloud of the environmental FOV. The extracted ground data points may then be used for determination of the features of the navigation path as will be described in greater detail in conjunction with FIGS. 5-8.

It should be noted that, in some embodiments, the ground data points present in the data points cloud of the environmental FOV may be extracted using an appropriate threshold. This is achieved by measuring an elevation and/or a change of elevation of each data point along a certain LIDAR ring with respect to a base elevation for that LIDAR ring. As will be appreciated, the base elevation may be an elevation on which the navigation path may substantially adhere to (i.e., ground) and may be considered as reference height for computation of elevation for all the data points. The data points cloud at some height (e.g., divider, road boundaries, etc.) or at some low/declined heights (e.g., ponds, non-drivable sloppy terrain) than the base height or road surface height may be filtered out. The remaining data points cloud or the ground data points may be therefore at about same plane or base elevation for each LIDAR ring. In other words, if some of the data points in the data points cloud of the environmental FOV represents the ground region, then with the appropriate threshold (e.g., 10 centimetre) all the data points representing ground plane may be extracted.

The vehicle positioning module 203 may determine a location of the vehicle along the navigation path of the vehicle using data received from one or more position sensors (e.g., GPS, IMU, odometer, etc.) installed on the vehicle. In some embodiments, the GPS sensor may provide a latitude and a longitude of the position of the vehicle. As will be appreciated, the GPS data may be employed to determine the latitude and the longitude of the extracted features, and update the same on the navigation map.

The map creation module 204 may receive the extracted features of the navigation path from the navigation path feature extraction module 202 through an interconnect C2. The map creation module 204 may further receive the location of the vehicle (i.e., the latitude and the longitude value) along the navigation path of the vehicle from the vehicle positioning module 203 through an interconnect C3. The map creation module 204 may then correlate the extracted features with the navigation path on the navigation map based on the position, and generate a features based navigation map based on the correlation. In some embodiments, the extracted features may be correlated with the navigation path by overlaying each of the extracted features with the navigation path for a given position on the navigation map. Thus, the features based navigation map may be created by overlaying or appending the extracted features (e.g., road characteristics) on the standard navigation map (i.e., the navigation map initially provided by the map service provider) for every latitude and longitude. In some embodiments, the overlaying or appending may be performed using standard API provided by the navigation map. The features based navigation map may be then provided to the central map control module 205 for storage and for subsequent use.

The central map control module 205 may receive the features based navigation map from the map creation module 204 through a connection C4. The central map control module 205 may then distribute the featured based map to other vehicles for navigation purposes. In some embodiments, once a passenger enters a source and a destination, the central map control module 205 may determine a navigation path (i.e., road) from the source to the destination on a navigation map. The central map control module 205 may also receive input from the navigation path assessment module 206, through an interconnect C5, about the features or characteristics of the determined navigation path on which the vehicle is traveling. The central map control module 205 may provide the navigation path on the features based navigation map to the vehicle navigation assist module 207. Further, the central map control module 205 may provide appropriate alerts and warning messages to the vehicle navigation assist module 207. The central map control module 205 may further receive alerts or feedbacks from the vehicle navigation assist module 207 about new features encountered by the vehicle which is not present in the features based navigation map, and may dynamically update the new features on the features based navigation map for subsequent use.

The navigation path assessment module 206 may include a navigation path analyser and a knowledge base. The knowledge base may store may store information about various navigation paths (i.e., routes). For example, the knowledge base may store information on whether a particular navigation path is structured and unstructured. The analyzer may retrieve information about a determined navigation path form the source to the destination from the knowledge base, analyze the same, and provide the analysis to the central map control module 205. Thus, the navigation path assessment module 206 may provide assessment of a given navigation path to the central map control module 205. For example, the navigation path assessment module 206 may assess whether the one or more stretches of the navigation path are rugged, or are smooth. Such information may be useful in deciding whether the chosen navigation path can be used for navigation, or whether an alternate navigation path should be chosen. The navigation path assessment module 206 may decide the structure of the navigation path based on one or more pre-defined or pre-determined threshold values, and some pre-determined conditions.

The vehicle navigation assist module 207 may communicate with the central map control module 205 through one or more commination interface C6. As will be appreciated, the vehicle navigation assist module 207 may include, but is not limited to vehicle map module 208, vehicle alert module 209, or vehicle navigation control module 210. The vehicle map module 208 may receive features based navigation map from the central map control module 205, thereby assisting in the navigation of the vehicle. It should be noted that there may be multiple vehicles that may obtain the features based navigation map. The features based navigation maps with features of respective navigation paths may help the vehicles in performing safe navigation.

The vehicle navigation control module 210 may enable in autonomous or semi-autonomous navigation of the vehicle based on the navigation path on the features based navigation map received from the central map control module 205. Further, in some embodiments, some of the vehicles may also have camera and other sensors (e.g., LIDAR) mounted on the hood of the vehicle for detecting dynamic changes in real-time environment. For example, the camera may be mounted on the vehicle in such a way that the entire scene in front of the vehicle should be clearly visible. Additionally, the camera may be oriented perpendicular to the vehicle, and images from the mounted camera may be employed by the vehicle navigation control module 210 for the various navigation purposes such as obstacle detection and avoidance in real-time.

The vehicle alert module 209 may send any changes in the features on the navigation path (i.e., features that does not correspond to the existing features in the features based navigation map) while performing navigation to the central map control module 205. The changes may include presence of any new features on the navigation path or absence of existing features from the navigation path. For example, the changes may include, but are not limited to, presence of new hump on the road, presence of new intersection, removal of existing hump from the road, closure of an intersection, change in the width of the road, or change in the slope of the road. Upon detecting the change, the detected change in the features may be sent to the central map control module 205 to update the features based navigation map for subsequent use.

It should be noted that the map generation engine 200 may be implemented in programmable hardware devices such as programmable gate arrays, programmable array logic, programmable logic devices, and so forth. Alternatively, the map generation engine 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for generating and updating a vehicle navigation map with features of a navigation path. For example, the exemplary system 100 and the associated map generation engine 200 may generate and update features based navigation maps by the processes discussed herein. In particular, as will be appreciated by those of ordinary skill in the art, control logic and/or automated routines for performing the techniques and steps described herein may be implemented by the system 100 and the associated map generation engine 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
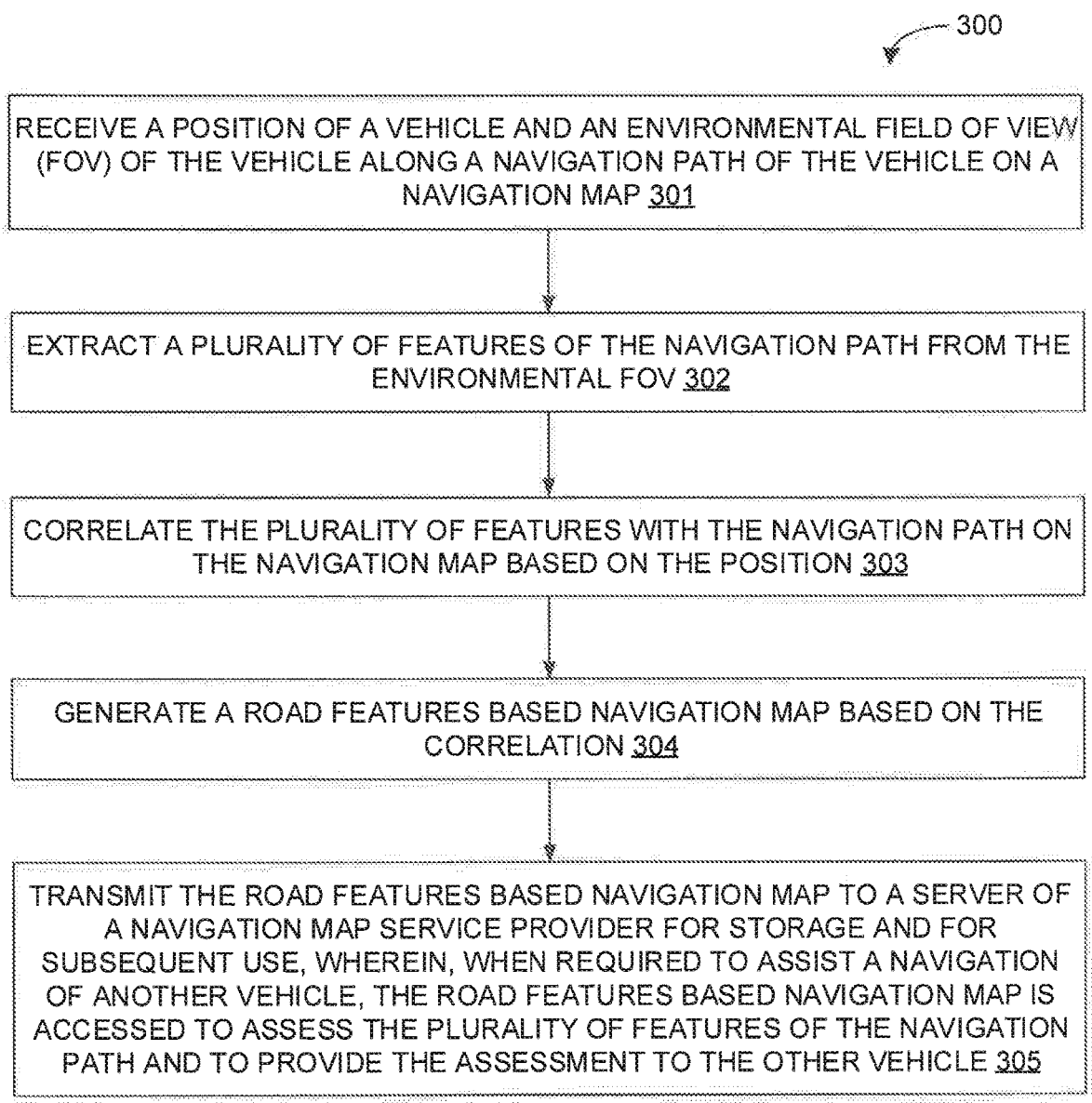
FIG. 3 is a flow diagram of an exemplary process for generating and updating a vehicle navigation map with features of a navigation path in accordance with some embodiments of the present disclosure.

For example, referring now to FIG. 3, exemplary control logic 300 for generating and updating a vehicle navigation map with features of a navigation path via a system, such as system 100, is depicted via a flowchart in accordance with some embodiments of the present disclosure. As illustrated in the flowchart, the control logic 300 may include the steps of receiving a position of a vehicle and an environmental field of view (FOV) of the vehicle along a navigation path of the vehicle on a navigation map at step 301, extracting a plurality of features of the navigation path from the environmental FOV at step 302, correlating the plurality of features with the navigation path on the navigation map based on the position at step 303, generating a features based navigation map based on the correlation at step 304, and transmitting the features based navigation map to a server of a navigation map service provider for storage and for subsequent use at step 305. The features based navigation map, when required to assist a navigation of another vehicle, may be accessed to assess the plurality of features of the navigation path and to provide the assessment to the other vehicle. In some embodiments, the control logic 300 may further include the steps of receiving a feedback from the other vehicle with respect to a presence of one or more new features or an absence of one or more existing features of the navigation path, and dynamically updating the features based navigation map based on the feedback.

In some embodiments, the position of the vehicle along the navigation path may be received from a GPS sensor. Additionally, in some embodiments, the environmental FOV along the navigation path may be received from a LIDAR scanner placed in front of the vehicle. Further, in some embodiments, the navigation path and the navigation map may be received from the navigation map service provider.

In some embodiments, the plurality of features may be extracted by extracting and analyzing ground data points from environmental data points cloud of the environmental FOV. It should be noted that, in some embodiments, the plurality of features may include, but are not limited to, a width of the navigation path, a hump on the navigation path, an angle of elevation of the navigation path, a number of intersections on the navigation path, or an angle of turn at an intersection on the navigation path. Additionally, in some embodiments, the plurality of features may be correlated with the navigation path by overlaying each of the plurality of features with the navigation path for a given position on the navigation map. Further, in some embodiments, assisting the navigation of the other vehicle may include providing, based on the assessment, at least one of an alert, a warning message, a notification, an instruction, or an alternate navigation path to at least one of an infotainment device of the other vehicle, an autonomous navigation module of the other vehicle, or a personal device of a passenger of the other vehicle.

In some embodiments, extracting the width of the navigation path from the environmental FOV at step 302 may include the steps of extracting ground data points from environmental data points cloud of the environmental FOV, determining a gradient between adjacent data points in the ground data points, determining boundary data points based on the corresponding gradients and a threshold value, and determining the width of the navigation path based on a distance between the boundary data points.

Additionally, in some embodiments, extracting the angle of turn at the intersection on the navigation path from the environmental FOV at step 302 may include the steps of determining, from the environmental FOV, a width of the navigation path and a width of an intersecting navigation path, determining center data points of the navigation path based on the width of the navigation path and center data points of the intersecting navigation path based on the width of the intersecting navigation path, determining a slope of a center line of the navigation path based on the center data points of the navigation path and a slope of a center line of the intersecting navigation path based on the center data points of the intersecting navigation path, and determining the angle of turn at the intersection based on the slope of the center line of the navigation path and the slope of the center line of the intersecting navigation path.

Further, in some embodiments, extracting the angle of elevation of the navigation path from the environmental FOV at step 302 may include the steps of extracting ground data points from environmental data points cloud of the environmental FOV, clustering the ground data points to obtain clustered data points, and determining the angle of elevation of the navigation path based on a relative gradient between the clustered data points.

Moreover, in some embodiments, extracting the hump on the navigation path from the environmental FOV at step 302 may include the steps of obtaining a set of frames of environmental FOV at different time intervals, overlaying the set of frames of environmental FOV on top of each other to generate an overlaid frame, extracting ground data points from the overlaid frame, determining a gradient, in a vertical direction, between adjacent data points in the ground data points, iterating the process of obtaining a new set of frames and determining a new gradient based on the gradient and a threshold value, determining a coordinate data point for each of the iteration, and based on the gradient, and determining a slope of the hump based on the coordinate points.

Figure 4:
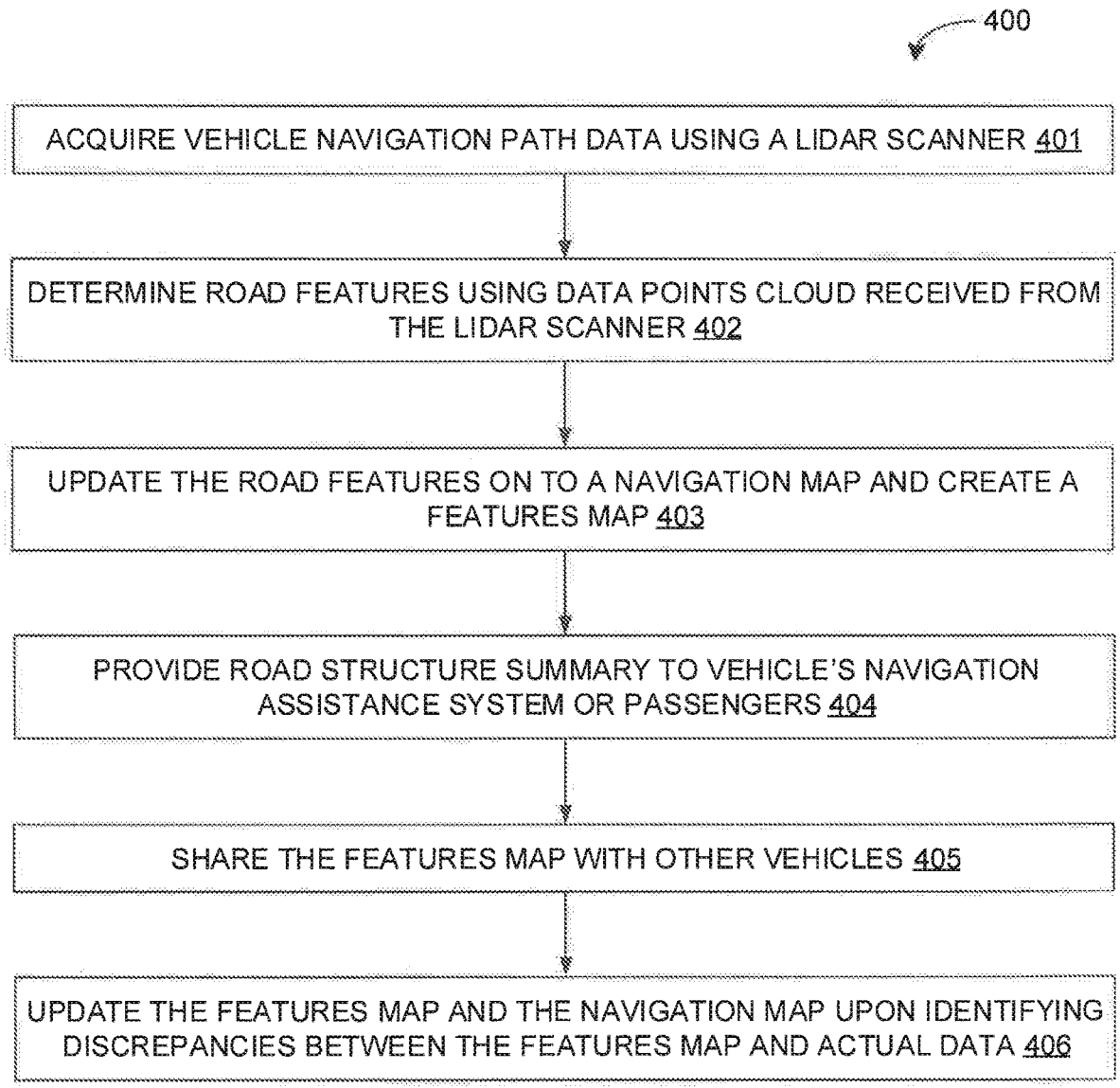
FIG. 4 is a flow diagram of a detailed exemplary process for generating and updating vehicle navigation maps with features of navigation paths using LIDAR data in accordance with some embodiments of the present disclosure.

Referring now to FIG. 4, exemplary control logic 400 for generating and updating vehicle navigation maps with features of navigation paths using LIDAR data is depicted in greater detail via a flowchart in accordance with some embodiments of the present disclosure. As illustrated in the flowchart, the control logic 400 may include the steps of acquiring vehicle navigation path data using a LIDAR scanner at step 401, determining road features using data points cloud received from the LIDAR scanner at step 402, updating the road features on to a navigation map and creating a features map at step 403, providing road structure summary to vehicle's navigation assistance system or passengers 404, sharing the features map with other vehicles at step 405, and updating the features map and the navigation map upon identifying discrepancies between the features map and actual data at step 406. Each of the steps 401-405 will be described in greater detail herein below.

At step 401, the vehicle path data extraction module 201 may acquire visual data of the navigation path using a LIDAR scanner as the vehicle move along the navigation path. As will be appreciated, the visual data may be acquired in data points cloud format. The LIDAR scanner may be placed in the hood of the vehicle at a certain distance (say, 1.5 meters) from the ground in such a way that the entire navigation path in front of the vehicle may be clearly visible.

At step 402, the navigation path feature extraction module 202 may extract ground data points present in the LIDAR data points cloud. If any of the data points in the LIDAR data points cloud represent the ground region, then such data points may be extracted with the appropriate threshold (e.g., 10 centimetre) as the ground data points. The extracted ground data points may then be used to determine various road features. The road features may include, but are not limited to, a width of the road, an angle of turn at an intersection on the road, a slope of the road, or a position and a slope of a hump on the road. The extraction of some of the above mentioned features will be described in greater detail in conjunction with FIGS. 5-8.

At step 403, the map creation module 204 may receive the extracted road features from the navigation path feature extraction module 202. The map creation module 204 may further receive a latitude and a longitude of the vehicle from the vehicle positioning module 203. The map creation module 204 may also receive map information of the current navigation path (i.e., source to destination path) on a standard navigation map (e.g., GOOGLE map). The map creation module 204 may then create a features based navigation map by overlaying (appending) the extracted road features for every latitude and longitude on to the standard navigation map. The map creation module 204 may then provide the features based navigation map to the central map control module 205 for storage and for subsequent use.

At step 404, the central map control module 205 in conjunction with the navigation path assessment module 206 may perform road structure analysis and provide the road structure summary to the vehicle's navigation assistance system or to the passengers. By way of an example, the roads may be categorized as highway roads and non-highway roads. Different thresholds may be set for a width of road, a number of humps, an angle of slope, a number of intersections, and so forth so as to determine whether a road is a structured road or an unstructured road. Additionally, the distance from a source to a destination (i.e., the navigation path) may be divided into a number of segments based on a road category. The length of a segment may be based on threshold values set for highway roads (say, 10 kilometre) and for non-highway roads (say, 2 kilometre). Thus, for example, a 10 kilometre distance on a non-highway road may be divided into 5 segments of 2 kilometre each. Similarly, for example, a 100 kilometre distance on a highway road may be divided into 10 segments of 10 kilometre each.

Upon determining segments of the navigation path, road width at various positions along a segment of the navigation path may be determined and an average road width may be calculated. If the determined road width is below the average road width, the number of times it is less may be counted and may be considered as number of bad structures. Similarly, a number of bad structures may be counted, for each segment, for other road features such as slope angle, a number of intersections, a number of humps, and so forth. By way of an example, in some embodiments, an exemplary count of bad structures for different features in different segments of the navigation path is provided in Table A below:

TABLE A

| | Number of bad structures | | | | |
|---|---|---|---|---|---|
| | 0-2 KM | 2-4 KM | 4-6 KM | 6-8 KM | 8-10 KM |
| Width of road | 2 | 5 | 2 | 1 | 5 |
| Angle of Slope | 4 | 4 | 3 | 5 | 4 |
| Number of intersection | 3 | 2 | 1 | 1 | 2 |
| Number of humps | 3 | 2 | 1 | 2 | 1 |

If the number of bad structure for a given feature are above a pre-defined or pre-determined threshold value (say, 2) for that feature, then the parameter structure index (PSI) for that feature is considered as 1 (i.e., for unstructured) or else 0 (i.e., structured). For example, if there are more than 2 humps in a 2 kilometer segment, then the navigation path segment is unstructured with respect to the number of humps and the PSI for the number of humps may be set at 1. Upon determination of PSI for each of the features for a given segment, a segment structure index (SSI) may be calculated based sum of PSI's (i.e., (sum of PSI for a number of humps, a number of intersections, a road slope, a road width, etc.) and a pre-defined or pre-determined segment threshold value. Thus, if sum of PSI's for a given segment is above the segment threshold value (say, 2), then the SSI for that segment is considered as 1 (i.e., for unstructured) or else 0 (i.e., structured). By way of an example, in some embodiments, an exemplary PSI for different features in different segments of the navigation path, and SSI in different segments of the navigation path, based on count of bad structures for different features in different segments of the navigation path as provided in Table A above, is provided in Table B below:

TABLE B

|  | Parameter Structure Index (PSI) | | | | |
| --- | --- | --- | --- | --- | --- |
|  | 0-2 KM | 2-4 KM | 4-6 KM | 6-8 KM | 8-10 KM |
| Width of road | 0 | 1 | 0 | 0 | 1 |
| Angle of Slope | 1 | 1 | 1 | 1 | 1 |
| Number of intersection | 1 | 0 | 0 | 0 | 0 |
| Number of humps | 1 | 0 | 0 | 0 | 0 |
| Sum of PSI's | 3 | 2 | 1 | 1 | 2 |
| Segment Structure Index (SSI) | 1 | 0 | 0 | 0 | 0 |

Additionally, an overall road structure index (RSI) may be calculated based on the PSI for each feature for each of the segment as per equation (1) below:

$$\text{Overall RSI} = 1 - (\text{Sum of PSI's for each feature for each of the segment})/(\text{Number of Segments} \times \text{Number of Features}) \quad \text{Equation (1)}$$

Thus, in the example provided in Table A and Table B, an exemplary RSI may be computes as follows:
a) Sum of PSI's for each feature for each of the segment=9;
b) Number of Segments=5;
c) Number of Features=4;
d) Overall RSI=1−(9/(4×5))=1−9/20=0.55.

Alternatively, an overall road structure index (RSI) may be calculated based on the number of segments and structured road indices as per equation (2) below:

$$\text{Overall RSI} = (\text{total good structured indices})/(\text{sum of good and bad structured indices}) \quad \text{Equation (2)}$$

Thus, in the example provided in Table A and Table B, an exemplary RSI may be computes as follows:
a) Total number of bad structured indices=9 (i.e., count of 1 s);
b) Total number of good structured indices=11 (i.e., count of 0 s);
c) Overall RSI=11/(11+9)=11/20=0.55.

The overall RSI may be provided with the other details to the vehicle navigation assist module 207, which, in turn, may display the same to the passenger via a user interface (UI) of the vehicle map module 208 or may provide the same to the vehicle navigation control module 210 for autonomous or semi-autonomous navigation. For example, the summary of road information may mention the bad segments, overall RSI, etc. Thus, in the above example, the vehicle map module 208 may inform the passengers that the $1^{st}$ segment (0-2 KM) is a bad segment and overall 55% road is structured.

Further, at step 405, the central map control module 205 may share the features map with all other vehicles that are communicatively coupled to the map provider server containing the central map control module 205. It should be noted that the other vehicles may not be using any sensor devices (e.g., LIDAR scanner) and may depend solely on the features based navigation maps for road features while performing the navigation. Further, even the vehicles with sensor devices (e.g., LIDAR scanner) may be able to receive and utilize the updated feature maps from the central map control module 205. As will be appreciated, when a passenger may be desirous of travelling to a new destination, the passenger may feed the details of the new destination to the vehicle map module 208, which, in turn, may request and receive the appropriate features based navigation map from the central map control module 205.

At step 406, the vehicle alert module 209 may identify any discrepancies between the received features map and the actual data and accordingly send alert to the central map control module 205. Some of the vehicles may have the functionality to identify at least some of the features (e.g., humps) using camera even though they cannot determine detail characteristics of the identified feature (e.g., slope of the hump). Further, some of the vehicles may have the functionality to identify all the features using advance sensors (e.g., LIDAR scanner). If the vehicle alert module 209 determines any discrepancy between the data from features map and the actual data of road at any point of time, the vehicle alert module 209 will inform about such discrepancies to the central map control module 205. The central map control module 205 may then update the features map and the features based navigation map based on the information received from the vehicle alert module 209. The central map control module 205 may further share the updated features based navigation map with other vehicles.

Figure 5:
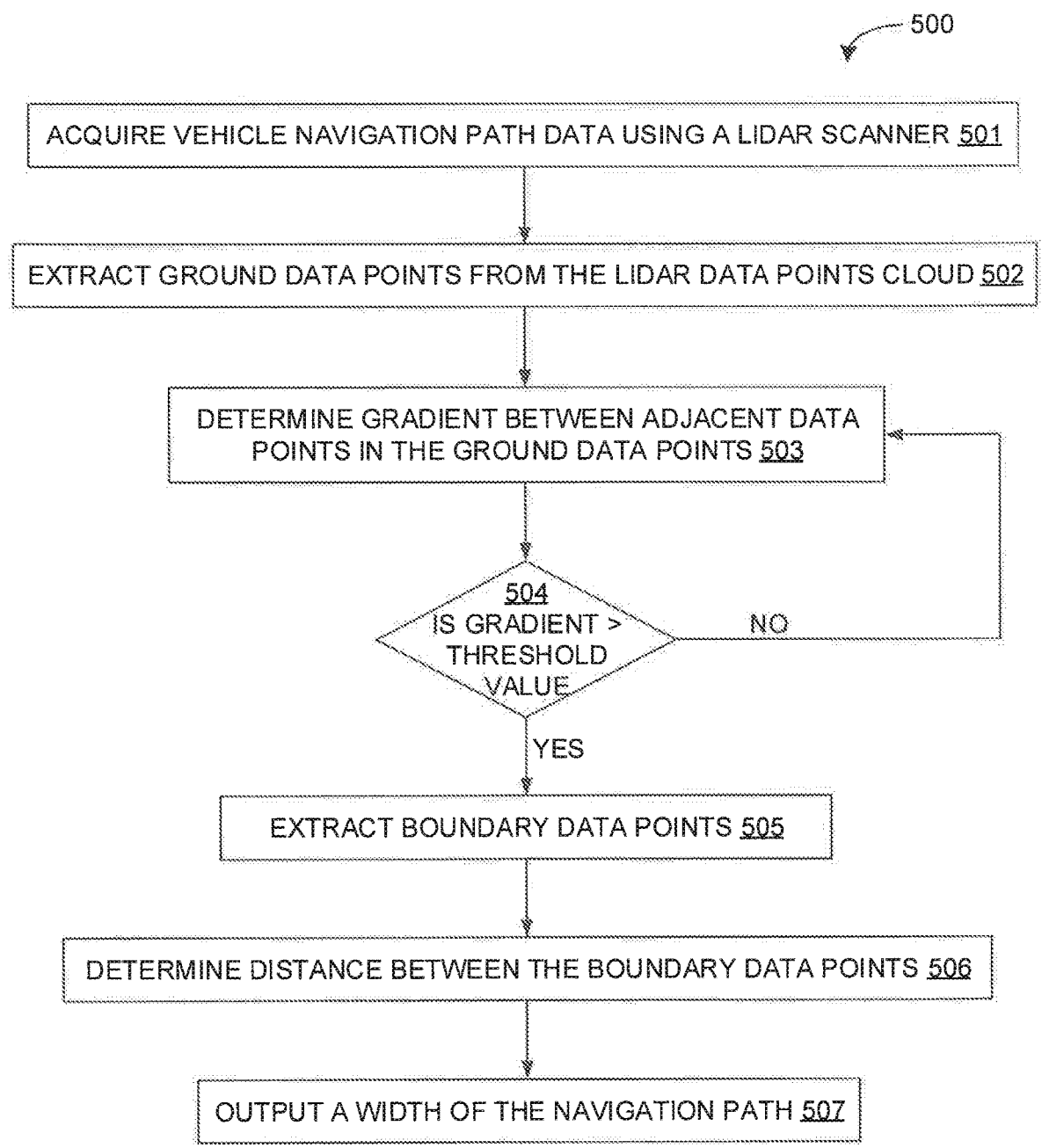
FIG. 5 is a flow diagram of an exemplary process for extracting a width of a navigation path in accordance with some embodiments of the present disclosure.

Referring now to FIG. 5, exemplary control logic 500 for extracting a width of a navigation path is depicted via a flowchart in accordance with some embodiments of the present disclosure. As illustrated in the flowchart, the control logic 500 may include the steps of acquiring vehicle navigation path data using a LIDAR scanner at step 501 and extracting ground data points from the LIDAR data points cloud at step 502. Once the navigation path is mapped using LIDAR data points cloud, the data points that are close to the ground may be extracted as ground data points by fixing a threshold value. The control logic 500 may further include the steps of determining gradient between adjacent data points in the ground data points at step 503, and determining whether the gradient is greater than a threshold value at step 504. If the gradient is not greater than the threshold value at step 504, the control logic 500 may flow back to step 503. However, if the gradient is greater than the threshold value at step 504, the control logic 500 may include the steps of extracting boundary data points at step 505. As will be appreciated, the data points that have the largest difference in gradient values and that exceed the threshold value may be considered to be the boundary data points.

The control logic 500 may further include the steps of determining a distance between the boundary data points at step 506, and providing the width of the navigation path based on the determined distance at step 507. In some embodiments, if (x1,y1) and (x2, y2) are coordinate points of the extracted boundary data points, the distance (D) between the extracted boundary data points may be computed using Euclidean distance formulation as per equation (3) below. In some embodiments, the width of the navigation path is the distance (D) between the extracted boundary data points.

$$D=(x1-x2)^2+(y1-y2)^2 \qquad \text{Equation (3)}$$

Figure 6:
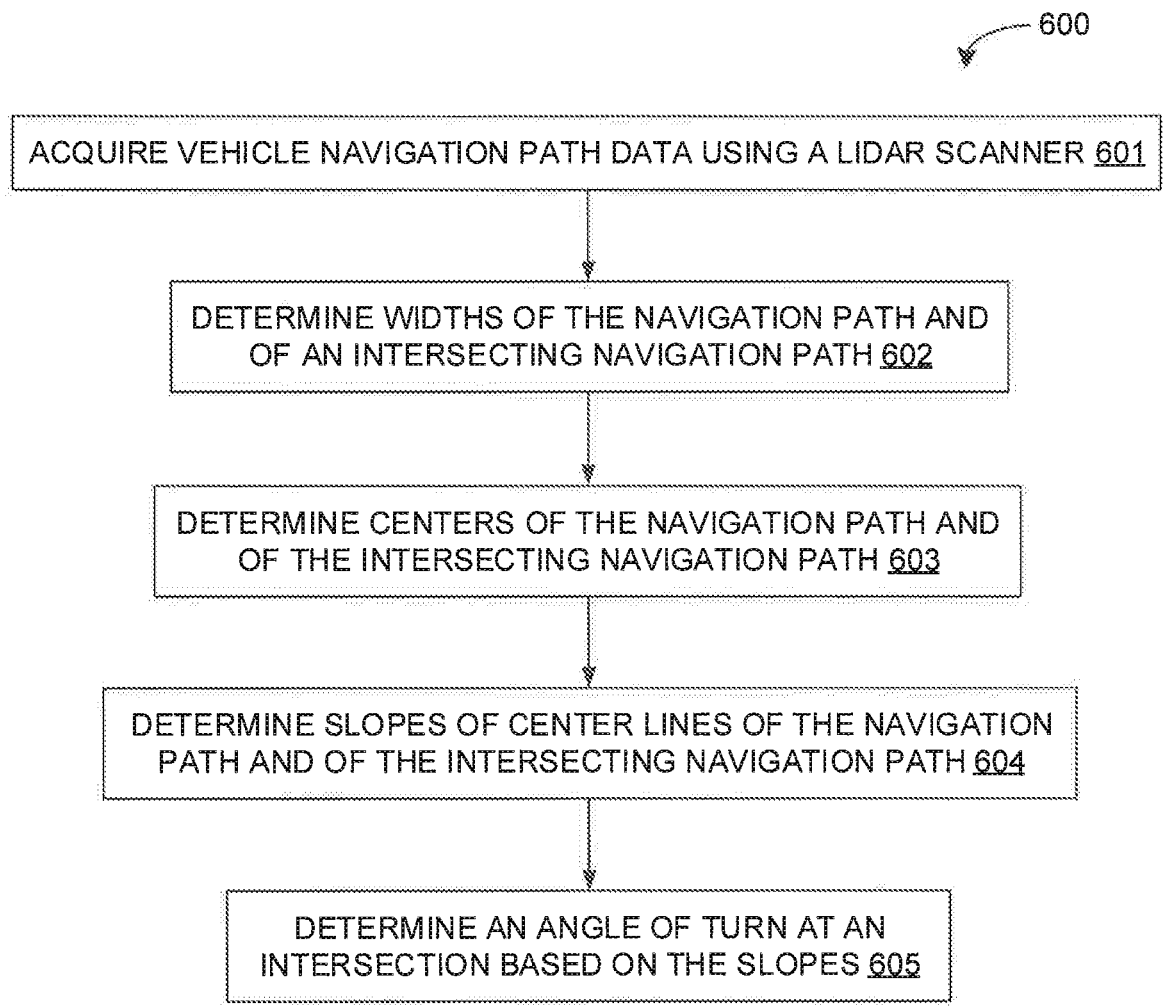
FIG. 6 is a flow diagram of an exemplary process for extracting an angle of turn at an intersection on a navigation path in accordance with some embodiments of the present disclosure.

Referring now to FIG. 6, exemplary control logic 600 for extracting an angle of turn at an intersection on a navigation path is depicted via a flowchart in accordance with some embodiments of the present disclosure. As illustrated in the flowchart, the control logic 600 may include the steps of acquiring vehicle navigation path data using a LIDAR scanner at step 601, determining a width of the navigation path as well as a width of an intersecting navigation path at step 602, and determining center data points of the navigation path based on the width of the navigation path as well as center data points of the intersecting navigation path based on the width of the intersecting navigation path at step 603. In some embodiments, the center data points of the navigation path may be determined from the width of the navigation path by determining data points that are at a distance approximately equal to half the width of navigation path from either of the boundary data points. It should be noted that the center data points need to be determined for both the navigation path (i.e., the navigation path on which the vehicle is moving) and the intersecting navigation path (i.e., the navigation path on which the vehicle intends to turn).

The control logic 600 may further include the step of determining a slope of a center line of the navigation path based on center data points of the navigation path and a slope of a center line of the intersecting navigation path based on center data points of the intersecting navigation path at step 604. In some embodiments, if (x1, y1) and (x2, y2) are coordinate points of the center data points of the navigation path and (x3, y3) and (x4, y4) are coordinate points of the center data points of the intersecting navigation path, the slope of the center line of the navigation path (m1) and the slope of the center line of the intersecting navigation path (m2) may be computed as per equations (4) and (5) below:

$$m1 = \frac{(y1-y2)}{(x1-x2)} \qquad \text{Equation (4)}$$

$$m2 = \frac{(y3-y4)}{(x3-x4)} \qquad \text{Equation (5)}$$

The control logic 600 may further include the step of determining the angle of turn at the intersection based on the slope of the center line of the navigation path and the slope of the center line of the intersecting navigation path at step 605. In some embodiments, the angle at which the vehicle has to turn (Theta) may be determined using the angle between both the slopes which may be determined as per equation (6) below:

$$\text{Theta} = \tan-1\left\{\left|\frac{(m1-m2)}{(1+m1m2)}\right|\right\} \qquad \text{Equation (6)}$$

Figure 7:
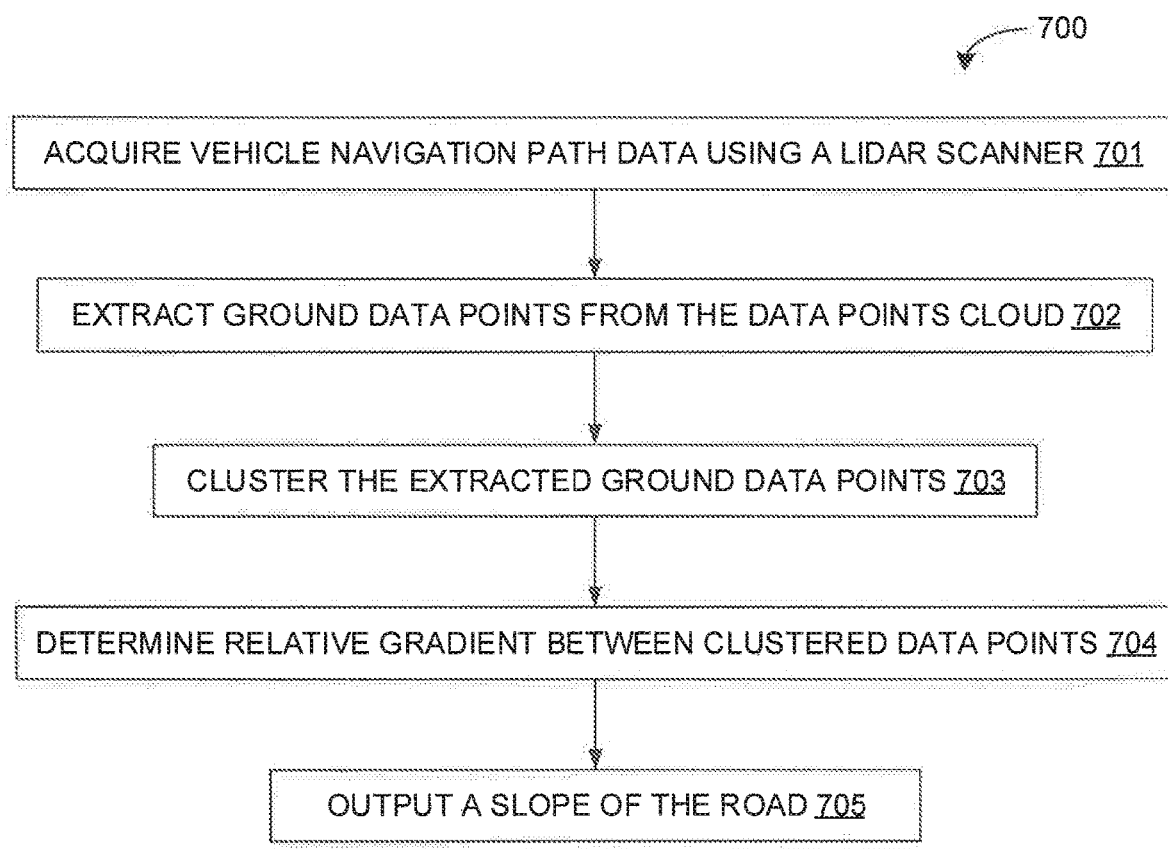
FIG. 7 is a flow diagram of an exemplary process for extracting an angle of elevation of a navigation path in accordance with some embodiments of the present disclosure.

Referring now to FIG. 7, exemplary control logic 700 for extracting an angle of elevation of a navigation path is depicted via a flowchart in accordance with some embodiments of the present disclosure. As illustrated in the flowchart, the control logic 700 may include the steps of acquiring vehicle navigation path data using a LIDAR scanner at step 701, and extracting ground data points from the LIDAR data points cloud at step 702. As stated above, once the navigation path is mapped using LIDAR data points cloud, the data points that are close to the ground may be extracted as ground data points by fixing a threshold value. The control logic 700 may further include the steps of clustering the ground data points to obtain clustered data points at step 703, determining a relative gradient between the clustered data points at step 704, and providing the angle of elevation of the navigation path based on the relative gradient at step 705. In some embodiments, the angle of elevation of the navigation path is the relative gradient between the clustered data points.

Figure 8:
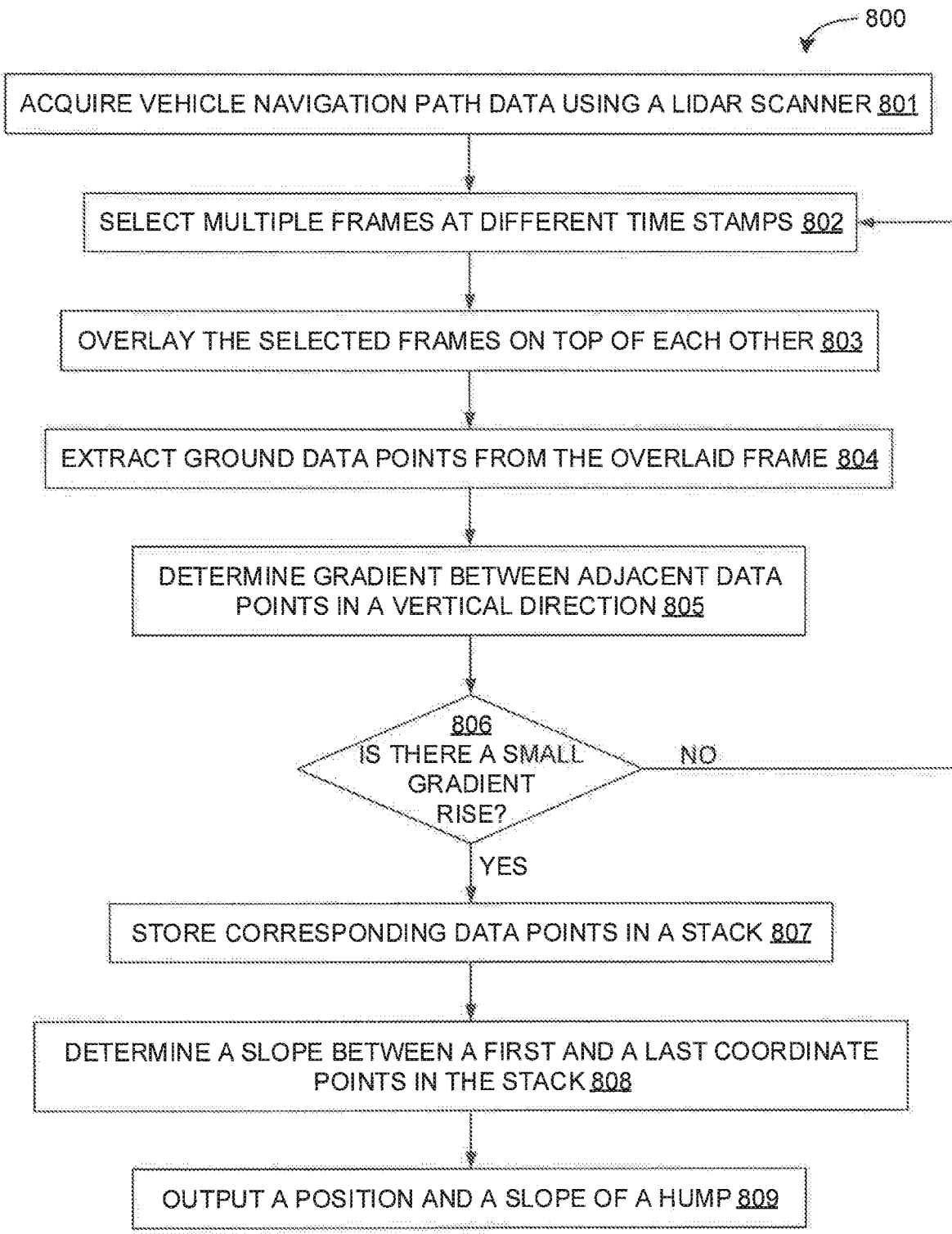
FIG. 8 is a flow diagram of an exemplary process for extracting a hump on a navigation path in accordance with some embodiments of the present disclosure.

Referring now to FIG. 8, exemplary control logic 800 for extracting a hump on a navigation path is depicted via a flowchart in accordance with some embodiments of the present disclosure. As illustrated in the flowchart, the control logic 800 may include the steps of acquiring vehicle navigation path data using a LIDAR scanner at step 801, and selecting multiple frames of the LIDAR data points cloud at different time intervals at step 802. Once the navigation path is mapped using LIDAR data points cloud, multiple frames (e.g., 4 or 5) at different time stamps may be selected. The control logic 700 may further include the steps of overlaying the selected frames on top of each other to generate an overlaid frame at step 803, extracting ground data points from the overlaid frame at step 804, and determining a gradient, in a vertical direction, between adjacent data points in the ground data points at step 805.

The control logic 800 may further include the step of determining whether there is a small and gradual change (i.e., rise or fall) in the gradient values in the vertical direction at step 806. It should be noted that the change in the gradient values should not be abrupt. If there is about negligible change in gradient values at step 806, then the control logic 800 may flow back to step 802. However, if there is a small and gradual change in gradient values at step 806, then the control logic 800 may include the step of storing coordinate data points of maximum gradient value at step 807 and iterating the process by selecting next set of multiple frames at different time stamps. In other words, corresponding coordinate data points of each maximum gradient value for each iteration may be stored in a stack. The iteration may stop after there is a gradual fall in gradient values. It should be noted that the first and the last coordinate data points present in the stack may represent the starting and ending point of a hump. The control logic 800 may further include the steps of determining a slope between the first and the last coordinate data points present in the stack at step 808, and providing a position of the hump based on the coordinate data points and a slope of the hump based on the determined slope at step 809.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 9:
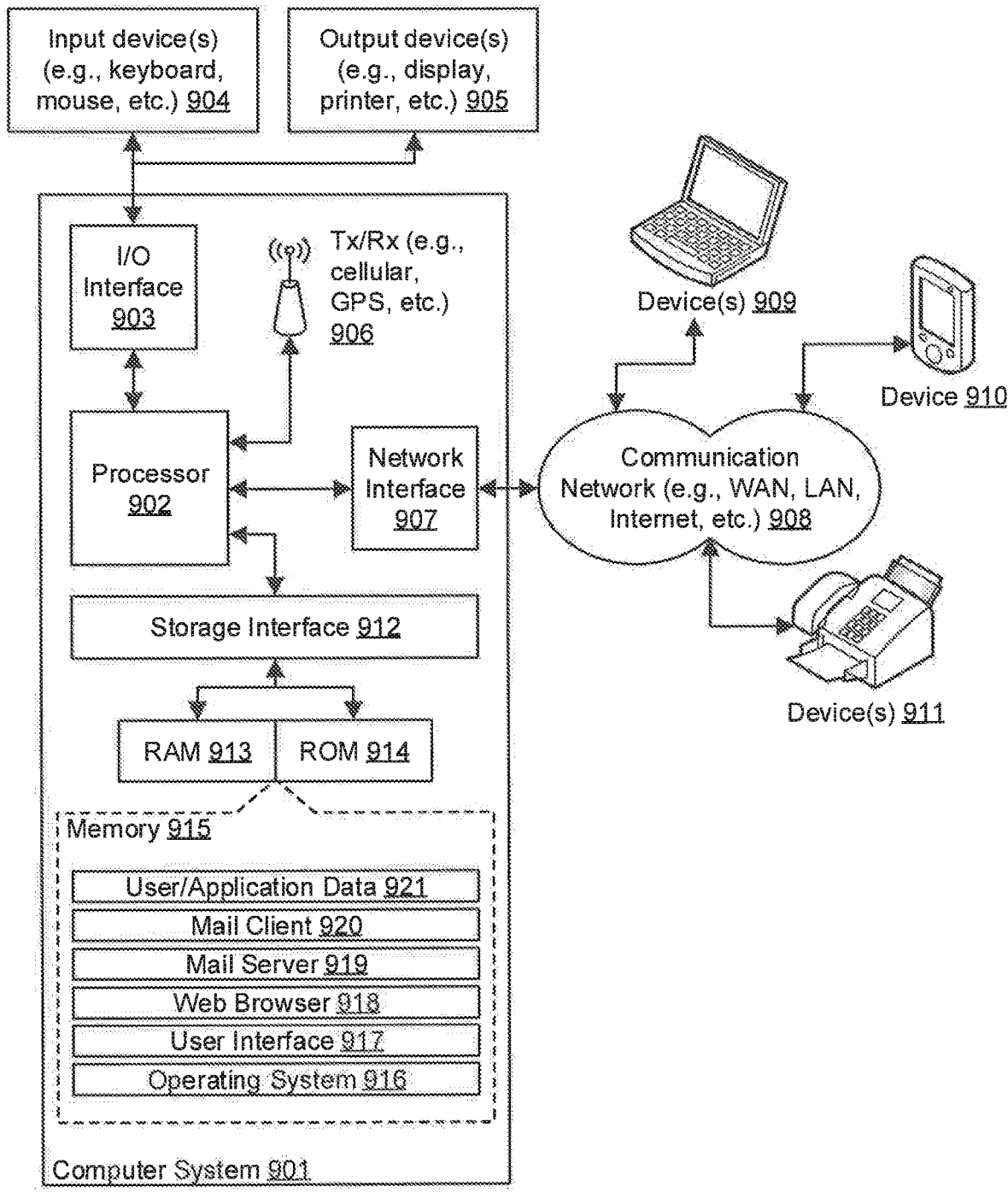
FIG. 9 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 9, a block diagram of an exemplary computer system 901 for implementing embodiments consistent with the present disclosure is illustrated. Variations of computer system 901 may be used for implementing system 100 and map generation engine 200 for generating and updating features based navigation maps for assisting navigation of vehicles or for alerting passengers. Computer system 901 may include a central processing unit ("CPU" or "processor") 902. Processor 902 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 902 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 902 may be disposed in communication with one or more input/output (I/O) devices via I/O interface 903. The I/O interface 903 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 903, the computer system 901 may communicate with one or more I/O devices. For example, the input device 904 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 905 may be a printer, fax machine, video display (e.g., cathode ray tube (CRT), liquid crystal display (LCD), light-emitting diode (LED), plasma, or the like), audio speaker, etc. In some embodiments, a transceiver 906 may be disposed in connection with the processor 902. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 902 may be disposed in communication with a communication network 908 via a network interface 907. The network interface 907 may communicate with the communication network 908. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 908 may include, without limitation, a direct interconnection, local area network (LAN), wide area network (WAN), wireless network (e.g., using Wireless Application Protocol), the Internet, etc. Using the network interface 907 and the communication network 908, the computer system 901 may communicate with devices 909, 910, and 911. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 901 may itself embody one or more of these devices.

In some embodiments, the processor 902 may be disposed in communication with one or more memory devices (e.g., RAM 913, ROM 914, etc.), collectively referred to as memory 915, via a storage interface 912. The storage interface 912 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices 915 may store a collection of program or database components, including, without limitation, an operating system 916, user interface application 917, web browser 918, mail server 919, mail client 920, user/application data 921 (e.g., any data variables or data records discussed in this disclosure), etc. The operating system 916 may facilitate resource management and operation of the computer system 901. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 917 may facilitate display, execution, interaction, manipulation, or operation of program components through textual or graphical facilities. For example, user interfaces may provide computer interaction interface elements on a display system operatively connected to the computer system 901, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 901 may implement a web browser 918 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 901 may implement a mail server 919 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 901 may implement a mail client 920 stored program component. The mail client may be a mail viewing application, such as Apple Mail, Microsoft Entourage, Microsoft Outlook, Mozilla Thunderbird, etc.

In some embodiments, computer system 901 may store user/application data 921, such as the data, variables, records, etc. (e.g., navigation map, navigation path, position of vehicle, environmental FOV, LIDAR data points cloud, ground data points, adjacent data points, boundary data points, clustered data points, center data points, gradients, coordinate data points, pre-defined or pre-determined threshold values, extracted features, features map, features based navigation maps, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above may provide for generating and updating of features based navigation maps for assisting navigation of vehicle and for alerting passenger of any road features (e.g., width of the road, humps present in the road, number of road intersections, angle of turn at intersection, slope of the road, etc.). The techniques may, therefore, help in safe navigation of the vehicle and to meet the safety critical requirements. Additionally, the techniques described in embodiments discussed above provide for sophisticated and less expensive way of extracting road features while saving computing power of the vehicle. This is achieved by pre-processing and preparing the data so as to make it readily available for the vehicle at runtime without spending additional time for computing these values and without using expensive sensors. In some embodiments, the vehicle navigation control system may readily use the prepared data so as to save its computing power and to make quick decisions for navigation. Further, in some embodiment, all the vehicles may not need to use the LIDAR scanner, thereby reducing the cost. Moreover, in some embodiments, connected vehicles may need to have only camera to update any incremental information about the roads. It should be noted that the techniques described above may be employed as advance navigation assistant system in the vehicles by the manufacturers. Further, it should be noted that the techniques may have applications in robotics vision.

The specification has described system and method for generating and updating vehicle navigation maps with features of navigation paths. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of generating a vehicle navigation map with features of a navigation path, the method comprising:
receiving, via a map generation device, a position of a vehicle and an environmental field of view (FOV) of the vehicle along the navigation path on the vehicle navigation map;
extracting, via the map generation device, a plurality of features of the navigation path from the environmental FOV, wherein the plurality of features comprises at least one of a width of the navigation path, a hump on the navigation path, an angle of elevation of the navigation path, a number of intersections on the navigation path, or an angle of turn at an intersection on the navigation path, and wherein extracting the angle of turn at the intersection on the navigation path from the environmental FOV comprises:
from the environmental FOV, determining the width of the navigation path and a width of an intersecting navigation path;

determining center data points of the navigation path based on the width of the navigation path, and center data points of the intersecting navigation path based on the width of the intersecting navigation path;

determining a slope of a center line of the navigation path on the vehicle navigation map based on the center data points of the navigation path, and a slope of a center line of the intersecting navigation path on the vehicle navigation map based on the center data points of the intersecting navigation path; and determining the angle of turn at the intersection based on the slope of the center line of the navigation path and the slope of the center line of the intersecting navigation path;

correlating, via the map generation device, the plurality of features with the navigation path on the vehicle navigation map based on the position;

generating, via the map generation device, a features based vehicle navigation map based on the correlation; and transmitting, via the map generation device, the features based vehicle navigation map to a server of a navigation map service provider for storage and for subsequent use, wherein, when required to assist a navigation of another vehicle, the features based vehicle navigation map is accessed, the plurality of features of the navigation path is assessed, and the assessment is provided to the other vehicle.

2. The method of claim 1, wherein the position of the vehicle along the navigation path is received from a GPS sensor, wherein the environmental FOV along the navigation path is received from a light detection and ranging (LIDAR) scanner placed in front of the vehicle, and wherein the navigation path and the vehicle navigation map are received from the navigation map service provider.

3. The method of claim 1, wherein the plurality of features are extracted by extracting and analyzing ground data points from environmental data points cloud of the environmental FOV.

4. The method of claim 1, wherein extracting the angle of elevation of the navigation path from the environmental FOV comprises:
  extracting ground data points from environmental data points cloud of the environmental FOV;
  clustering the ground data points to obtain clustered data points; and
  determining the angle of elevation of the navigation path based on a relative gradient between the clustered data points.

5. The method of claim 1, wherein extracting the hump on the navigation path from the environmental FOV comprises:
  obtaining a set of frames of environmental FOV at different time intervals;
  overlaying the set of frames of environmental FOV on top of each other to generate an overlaid frame;
  extracting ground data points from the overlaid frame;
  determining a gradient, in a vertical direction, between adjacent data points in the ground data points;
  iterating the process of obtaining a new set of frames and determining a new gradient based on the gradient and a threshold value;
  determining a coordinate data point for each of the obtained new set of frames, and based on the gradient; and
  determining a slope of the hump based on the coordinate points.

6. The method of claim 1, wherein the plurality of features are correlated with the navigation path by overlaying each of the plurality of features with the navigation path for a given position on the vehicle navigation map.

7. The method of claim 1, wherein assisting the navigation of the other vehicle comprises providing, based on the assessment, at least one of an alert, a warning message, a notification, an instruction, or an alternate navigation path to at least one of an infotainment device of the other vehicle, an autonomous navigation module of the other vehicle, or a personal device of a passenger of the other vehicle.

8. The method of claim 1, further comprising:
  receiving a feedback from the other vehicle with respect to a presence of one or more new features or an absence of one or more existing features of the navigation path; and
  dynamically updating the features based vehicle navigation map based on the feedback.

9. A system for generating a vehicle navigation map with features of a navigation path, the system comprising:
  a map generation device comprising at least one processor and a computer-readable medium storing instructions that, when executed by the at least one processor, cause the at least one processor to perform operations comprising:
  receiving a position of a vehicle and an environmental field of view (FOV) of the vehicle along the navigation path on the vehicle navigation map;
  extracting a plurality of features of the navigation path from the environmental FOV, wherein the plurality of features comprises at least one of a width of the navigation path, a hump on the navigation path, an angle of elevation of the navigation path, a number of intersections on the navigation path, or an angle of turn at an intersection on the navigation path, and wherein extracting the angle of turn at the intersection on the navigation path from the environmental FOV comprises:
  from the environmental FOV, determining the width of the navigation path and a width of an intersecting navigation path;
  determining center data points of the navigation path based on the width of the navigation path, and center data points of the intersecting navigation path based on the width of the intersecting navigation path;
  determining a slope of a center line of the navigation path on the vehicle navigation map based on the center data points of the navigation path, and a slope of a center line of the intersecting navigation path on the vehicle navigation map based on the center data points of the intersecting navigation path; and
  determining the angle of turn at the intersection based on the slope of the center line of the navigation path and the slope of the center line of the intersecting navigation path;
  correlating the plurality of features with the navigation path on the vehicle navigation map based on the position;
  generating a features based vehicle navigation map based on the correlation; and
  transmitting the features based vehicle navigation map to a server of a navigation map service provider for storage and for subsequent use, wherein, when required to assist a navigation of another vehicle, the features based vehicle navigation map is accessed, the plurality of features of the navigation path is assessed, and the assessment is provided to the other vehicle.

10. The system of claim 9, wherein the plurality of features are extracted by extracting and analyzing ground data points from environmental data points cloud of the environmental FOV.

11. The system of claim 9, wherein the plurality of features are correlated with the navigation path by overlaying each of the plurality of features with the navigation path for a given position on the vehicle navigation map.

12. The system of claim 9, wherein assisting the navigation of the other vehicle comprises providing, based on the assessment, at least one of an alert, a warning message, a notification, an instruction, or an alternate navigation path to at least one of an infotainment device of the other vehicle, an autonomous navigation module of the other vehicle, or a personal device of a passenger of the other vehicle.

13. The system of claim 9, wherein the operations further comprise:
  receiving a feedback from the other vehicle with respect to a presence of one or more new features or an absence of one or more existing features of the navigation path; and
  dynamically updating the features based vehicle navigation map based on the feedback.

14. A non-transitory computer-readable medium storing computer-executable instructions for:
  receiving a position of a vehicle and an environmental field of view (FOV) of the vehicle along a navigation path on a vehicle navigation map;
  extracting a plurality of features of the navigation path from the environmental FOV, wherein the plurality of features comprises at least one of a width of the navigation path, a hump on the navigation path, an angle of elevation of the navigation path, a number of intersections on the navigation path, or an angle of turn at an intersection on the navigation path, and wherein extracting the angle of turn at the intersection on the navigation path from the environmental FOV comprises:
    from the environmental FOV, determining the width of the navigation path and a width of an intersecting navigation path;
    determining center data points of the navigation path based on the width of the navigation path, and center data points of the intersecting navigation path based on the width of the intersecting navigation path;
    determining a slope of a center line of the navigation path on the vehicle navigation map based on the center data points of the navigation path, and a slope of a center line of the intersecting navigation path on the vehicle navigation map based on the center data points of the intersecting navigation path; and
    determining the angle of turn at the intersection based on the slope of the center line of the navigation path and the slope of the center line of the intersecting navigation path;
  correlating the plurality of features with the navigation path on the vehicle navigation map based on the position;
  generating a features based vehicle navigation map based on the correlation; and
  transmitting the features based vehicle navigation map to a server of a navigation map service provider for storage and for subsequent use, wherein, when required to assist a navigation of another vehicle, the features based vehicle navigation map is accessed, the plurality of features of the navigation path is assessed, and the assessment is provided to the other vehicle.

15. The non-transitory computer-readable medium of claim 14, wherein the plurality of features are extracted by extracting and analyzing ground data points from environmental data points cloud of the environmental FOV.

16. The non-transitory computer-readable medium of claim 15, further storing computer-executable instructions for:
  receiving a feedback from the other vehicle with respect to a presence of one or more new features or an absence of one or more existing features of the navigation path; and
  dynamically updating the features based vehicle navigation map based on the feedback.

\* \* \* \* \*